Dec. 14, 1954     S. THAULOW     2,696,733
CONSISTENCY TESTER FOR PLASTIC MASSES
Filed Jan. 18, 1951
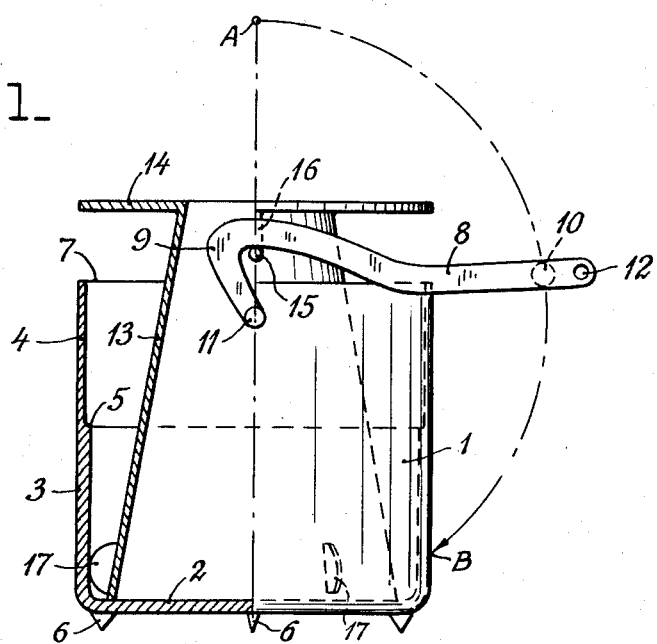
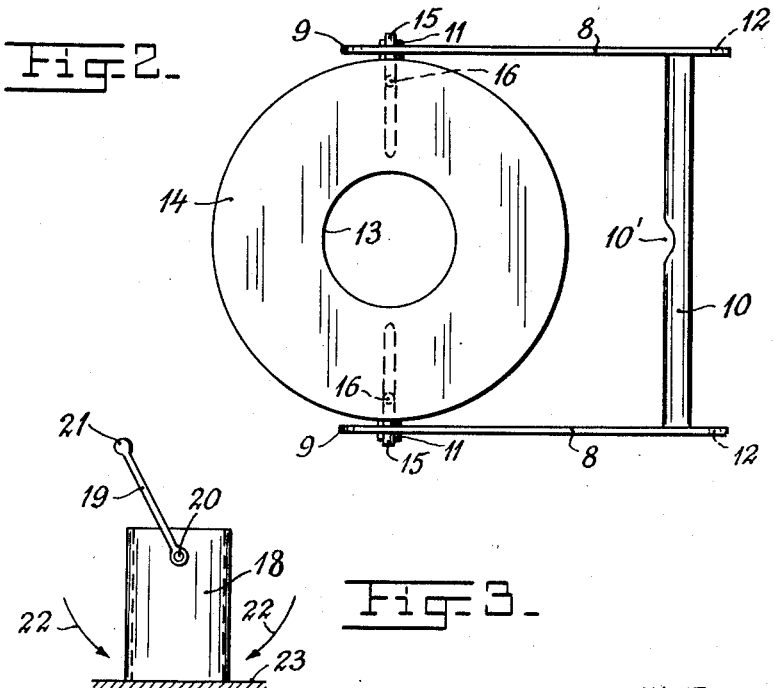
INVENTOR
Sven Thaulow
By Darby & Darby
ATTORNEYS

United States Patent Office 2,696,733
Patented Dec. 14, 1954

2,696,733

CONSISTENCY TESTER FOR PLASTIC MASSES

Sven Thaulow, Slemmestad, Royken, Norway

Application January 18, 1951, Serial No. 206,529

7 Claims. (Cl. 73—54)

The present invention relates to a device for shocking plastic masses, especially mortar, concrete, aggregates or the like, in a container so as to cause said masses to subside. This is opportune for a slump test made with a mould in the form of a hollow frustum of a cone which after being placed with its bottom end upon a support member, is filled with such mass and then removed, whereupon said support member with the moulded mass thereupon is subjected to shocks in order to cause the mass to subside.

In the production of concrete it is of prime importance that the concrete is of such a consistency that it is capable of being mixed and moulded to a homogeneous mass, i. e. has a certain workability. The determination of such workability of the concrete has been aided by suitable apparatus for testing consistency. Among such apparatus, the slump cone, above referred to, and a so-called flow table are most in use. This apparatus has been used for a considerable time for testing of wet concrete, but does not properly test of dry concrete which, owing to the introduction of vibrated concrete, has obtained extensive use. Subsequently there was also constructed measuring apparatus by which the consistency of dry concrete may be tested, but such apparatus, does not properly test of wet concrete.

The main object of the present invention is to provide a shock device which may be used for the determination of the consistency of all kinds of concretes and mortars, and which is cheap, light, easy to operate, and which gives reproduceable values.

The essential feature of the device according to the present invention is that a body, having a particular weight is moved along a certain path and thereby imparted a definite kinetic energy which, at the end of said path, is given off to the container as a shock.

In addition to the testing of consistency of mortar and concrete, the device may also be used in connection with moulds for producing specimens of concrete having prescribed dimensions.

The above and other objects of the invention are attained in an embodiment of the invention described as an example in connection with the accompanying drawings, in which:

Fig. 1 shows a side view, partly in section, of a device embodying the invention, Fig. 2 is a plan view thereof, and Fig. 3 shows a side view of a mould for specimens.

Referring to the Figs. 1 and 2 there is shown a hollow cylindrical container 1 having a bottom 2 and a wall consisting of a lower portion 3, and an upper portion 4 having a slightly greater internal diameter than that of the lower portion which portions meet in a circumferential edge or shoulder 5.

The distance between the bottom 2 and upper rim 7 of the wall is chosen so that the container holds a certain volume, such as 10 liters, whereas the distance from bottom 2 to 5 is chosen so that the space below a horizontal plane through said shoulder 5 represents one half of the whole volume of the container, i. e. in this case 5 liters.

Within the container 1 is placed a hollow frustum of a cone (so called slump cone) 13 which is at its upper end provided with a horizontal flange or collar 14 having a diameter which is greater than that of the container 1 in order to prevent that, during filling of said cone, mass falls down into the space between the cone and the wall of the container.

According to accepted international precepts the volume of the slump cone should be 5.5 liters. When testing the consistency of concrete the cone 13 is placed within the container 1, as shown, and is filled with the concrete deposited in layers each of which, in order to avoid cavities therein, is evenly tamped in the usual manner.

After the mould or cone has been filled it is lifted vertically upwards and removed. In order to secure that the cone is lifted axially upwards in correct position the lower end thereof is provided with a number of evenly spaced guiding fins or tongues 17 which engage the inner surface of the container 1.

The formed specimen is then shocked until the concrete is subsided or deformed to such a degree that it will reach the level marked out by shoulder 5 which, as mentioned above represents a volume of 5 liters.

However, as the specimen has a volume of 5.5 liters a rounded top containing 0.5 liter will extend above the plane of said level. The quantity of work which is consumed in order to convert the shape of the concrete from a frustum of a cone into a cylinder having a rounded top, is a measure of the consistency of the concrete.

The device for shocking the container 1 consists, in accordance with the present invention, of a body—in the embodiment shown constituted by the bail of the container—which is moved along a certain path (the circular path A—B shown in dotted lines) so that a kinetic energy is imparted to said body which, at the end B of said path, is transferred to the container as a shock or impact.

The body may have any shape and size. Thus it may consist of an iron ball. The form of the path may vary. The body may be caused to drop freely against the container from a certain height, or to roll along a tilted or curved track. Preferably, however, the body is formed as a swingable bail on the container, firstly, owing to the simplicity thereof and, secondly, because a container having a bail may be used for a number of other purposes on a building site.

In order to obtain an even subsiding of the mass within the container the bail is dropped alternately against opposite sides of the container.

As the filling of the cone with concrete and the tamping thereof results in that a vertically directed power component arises tending to lift the cone vertically, provisions must be made to maintain the cone pressed against the bottom 2 of the container during the filling process. The device for locking the cone in engagement with the bottom may be of any suitable construction.

In the embodiment shown in the drawing the lower ends of the bail legs 8, which form hooks 9 are pivoted on studs 11 secured to the container at the upper end thereof. The upper ends of the legs 8 are interconnected by a rod 10 serving as a grip. Said rod 10 is relatively thick and constitutes the substantial part of the weight which impacts the side wall of the container.

At opposite sides of the cone 13 and coinciding with a diametrical line are secured studs 15 which, if so desired, may be fastened to the collar 14 by connecting pieces 16.

During the filling of the cone 13 the bail is in the position shown in Fig. 1 and hooks 9 engage the studs 15 on the cone 13 thereby maintaining said cone pressed against the bottom 2.

In order that at the moment the body impacts the container all of the kinetic energy be transferred to the container and further to the mass, provisions must be made to prevent movement of the container relative to its support. This may be accomplished in different ways, for instance by means of a clamping device maintaining the container pressed against the support thereof. It is, however, preferred, as shown in the drawing to provide the bottom 2 with a number of points or knife-like projections 6 which are pressed into the support. Said support then consists of an immovable wooden plate.

For testing particularly firm consistencies, which otherwise, would require an excessively great number of impacts by the bail before the mass has finished subsiding, it may be desirable to increase the weight of the bail to such a degree that the effect thereof is doubled or trebled.

To this end the legs 8 of the bail are extended beyond the points of attachment of the rod 10 and are provided with holes 12 for attachment of an additional rod-like weight (not shown).

Fig. 3 illustrates a shocking device, similar to that of Figs. 1 and 2, applied to a mould 18 for producing cylindrical specimens. The mould 18 may comprise a hollow, cylindrical body or container and is placed on a support 23. A bail 19 having a rod-like grip 21 is pivotally secured to the mould by means of studs 20.

After the mould has been filled with the mass, which is deposited in layers, for instance three layers, during tamping as above described, the mould and thereby also the mass therein are subjected to shocks produced by the bail 19, 21, which is dropped from a vertical position, alternately to opposite sides as shown by the arrows 22, and impacts the mould as readily will be understood. The number of shocks to be used may be determined on before-hand by means of a test for consistency as described in connection with Figs. 1 and 2.

I claim:

1. A device for testing the consistency of plastic masses such as mortar, concrete, aggregates and the like in a container to cause the masses to subside, comprising in combination a container, a specimen mold having the shape of a hollow frustum of a cone, said mold being removably positionable within said container and resting centrally on the bottom thereof, a body having a definite mass, and means constraining said body to movement in a predetermined path relative to said container, said path terminating against the side of the container, whereby a definite kinetic energy is accumulated in said body and imparted to the container as a shock when said body reaches the terminal end of its path of movement.

2. A device according to claim 1 characterized in that said specimen mold is provided with guiding means at its outer circumference, said guiding means cooperating with the inner wall of the container to maintain the said mold centralized in said container during insertion, filling, and withdrawal thereof.

3. A device according to claim 1 characterized in that said container and said mold are provided with co-operating locking means to maintain the mold against the bottom of the container during filling.

4. A device according to claim 1 characterized in that said mold is provided at opposite sides thereof with studs cooperating with hooks pivotally secured to the container.

5. A device according to claim 1 characterized in that said body is formed as a bail pivotally attached to said container, the legs of said bail being provided with bent portions adjacent the pivoted ends thereof forming hooks which engage studs protruding from opposite sides of the mold to thereby maintain said mold pressed against the bottom of said container.

6. A device according to claim 1, the interior of said container being provided with a circumferential shoulder, said shoulder being so located that the volume of the container above and below said shoulder is substantially one-half the total volume.

7. A device for testing the consistency of plastic masses such as mortar, concrete, aggregates and the like in a container to cause the masses to subside, comprising in combination a container, said container having an interior upper portion of a slightly greater diameter than the lower portion thereof forming a shoulder, the location of said shoulder being so chosen that the volume of the container above and below said shoulder is substantially one-half of the entire volume, a body having a definite mass, said mass being determined in relation to the capacity of said container, and means constraining said body to movement in a predetermined path relative to said container, said path of movement terminating against said container whereby a definite kinetic energy is accumulated in said body and imparted to the container as a shock when said body arrives at the terminal end of its path of movement and subsidence of said mass occurs in proportion to the number and intensity of said shocks and is measured by said shoulder on said interior wall.

References Cited in the file of this patent

UNITED STATES PATENTS

| Number | Name | Date |
|---|---|---|
| 554,474 | Bradley | Feb. 11, 1896 |
| 1,233,843 | Chapman | July 17, 1917 |
| 2,247,553 | Hutchinson | July 1, 1941 |